UNITED STATES PATENT OFFICE.

HUGO WOLFF, OF LUDWIGSHAFEN-ON-THE-RHINE, GERMANY, ASSIGNOR TO BADISCHE ANILIN & SODA FABRIK, OF LUDWIGSHAFEN-ON-THE-RHINE, GERMANY, A CORPORATION.

ANTHRACENE DYES AND MAKING THE SAME.

1,063,000. Specification of Letters Patent. Patented May 27, 1913.

No Drawing. Application filed May 20, 1911. Serial No. 628,511.

*To all whom it may concern:*

Be it known that I, HUGO WOLFF, Ph. D., chemist, subject of the Grand Duke of Baden, residing at Ludwigshafen-on-the-Rhine, Germany, have invented new and useful Improvements in Anthracene Dyes and Making the Same, of which the following is a specification.

The specifications of Letters Patent Nos. 809,892, 818,992 and 818,336 describe the production of coloring matters by treating, with caustic alkali, a compound containing a benzanthrone group. Members of this class of coloring matters contain the dibenzanthrone grouping, and in the specification of Letters Patent No. 796,393 it is stated that such coloring matters can be further treated with a nitrating agent and that the products of nitration can, if desired, be reduced. Such nitration products and their reduction compounds constitute from olive-green to blue-green coloring matters.

The specification of Patent No. 906,367 (cf. British Patent No. 20,837/06) describes the production of coloring matters by first halogenating a compound containing a benzanthrone group and then acting on such halogenating benzanthrone derivative with caustic alkali; such coloring matters differ from the coloring matters described in the specification of Patent No. 818,336 in that they contain the iso-dibenzanthrone grouping:

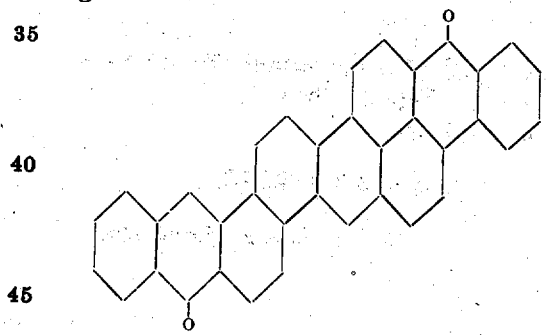

They are included under the term iso-dibenzanthrone bodies. I have now found that these iso-dibenzanthrone compounds can be treated with a nitrating agent and that the nitration products can, if desired, be subjected to reduction and that, in each case, valuable coloring matters can be obtained which dye vegetable fiber very fast shades which are generally of a bluer tinge than those produced by the products obtainable according to the specification of Letters Patent No. 796,393. The following are examples of how my invention can be carried into practical effect, but the invention is not confined to these examples. The parts are by weight.

Example 1: Suspend ten parts of iso-dibenzanthrone (obtainable according to Example 9 of the specification of British Letters Patent No. 20,837/06) in one hundred parts of nitrobenzene, and add twenty parts of eighty per cent. nitric acid. Warm the mixture gradually to from fifty to sixty degrees centigrade and maintain this temperature until, from a test portion, it is seen that no unaltered iso-dibenzanthrone is present. When the mixture is cold, filter off the product, wash it with nitrobenzene and alcohol, and dry it. The coloring matter so obtained is, when dry, a dark blue powder which yields a green solution in concentrated sulfuric acid and a violet-blue solution in boiling nitrobenzene. It yields a blue vat in alkaline hydrosulfite and from this vat vegetable fiber is colored blue shades which, upon washing and drying, become a very fast blue. In this example, the nitrobenzene can be replaced by other indifferent solvent, or diluent, for example glacial acetic acid.

Example 2: Dissolve ten parts of iso-dibenzanthrone in one hundred parts of ninety-seven per cent. sulfuric acid and add thirty-two parts of ten per cent. nitric acid. Heat the mixture for about six hours at from fifty to sixty degrees centigrade, then pour it into water and work up in the usual manner. The coloring matter obtained appears to be identical with that described in the foregoing example.

Example 3: Suspend ten parts of the product obtainable according to the foregoing Example 1 in five hundred parts of a ten per cent. solution of sodium sulfid and boil the whole for about thirty minutes. When the mixture is cold, filter off the reduction product and wash and dry it. It is, when dry, a powder with a metallic luster and yields a green solution in concentrated sulfuric acid and a greenish blue solution in boiling nitrobenzene. With alkaline hydrosulfite it yields a blue vat which dyes vegetable fiber shades similar to those produced by the nitro product.

My new coloring matters are characterized by being dark powders which yield green solutions in concentrated sulfuric acid, violet-blue to greenish blue solutions in boiling nitrobenzene, and yield blue vats with alkaline hydrosulfite from which vats cotton is dyed blue shades.

Now what I claim is:—

1. The process of producing new coloring matters of the anthracene series by treating an iso-dibenzanthrone body with a nitrating agent.

2. The process of producing new coloring matters of the anthracene series by treating an iso-dibenzanthrone body with a nitrating agent and then reducing the product so obtained.

3. As new articles of manufacture the coloring matters of the anthracene series which are derivatives of iso-dibenzanthrone containing nitrogen which coloring matters yield green solutions in concentrated sulfuric acid, violet-blue to greenish blue solutions in boiling nitrobenzene and yield blue vats with alkaline hydrosulfite from which vats cotton is dyed blue shades.

4. As a new article of manufacture the coloring matter of the anthracene series which is a nitrated iso-dibenzanthrone body, and which is a dark powder soluble in concentrated sulfuric acid with a green color, soluble in boiling nitrobenzene with a violet-blue color, yields with alkaline hydrosulfite a blue vat which dyes cotton blue shades.

In testimony whereof I have hereunto set my hand in the presence of two subscribing witnesses.

HUGO WOLFF.

Witnesses:
J. ALEC. LLOYD,
A. O. TITTMANN.

---

Correction in Letters Patent No. 1,063,000.

It is hereby certified that in Letters Patent No. 1,063,000, granted May 27, 1913, upon the application of Hugo Wolff, of Ludwigshafen-on-the-Rhine, Germany for an improvement in "Anthracene Dyes and Making the Same," an error appears in the printed specification requiring correction as follows: Page 1, lines 34-46, for the group

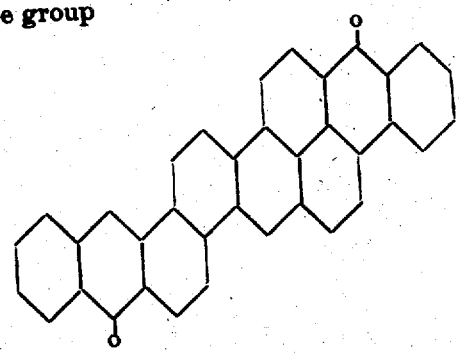 read 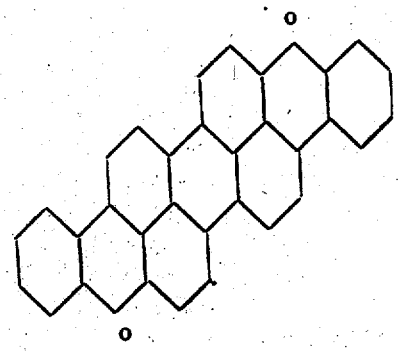

and that the said Letters Patent should be read with this correction therein that the same may conform to the record of the case in the Patent Office.

Signed and sealed this 19th day of August, A. D., 1913.

[SEAL.]

THOMAS EWING,

*Commissioner of Patents.* by being dark powders which yield green solutions in concentrated sulfuric acid, violet-blue to greenish blue solutions in boiling nitrobenzene, and yield blue vats with alkaline hydrosulfite from which vats cotton is dyed blue shades.

Now what I claim is:—

1. The process of producing new coloring matters of the anthracene series by treating an iso-dibenzanthrone body with a nitrating agent.

2. The process of producing new coloring matters of the anthracene series by treating an iso-dibenzanthrone body with a nitrating agent and then reducing the product so obtained.

3. As new articles of manufacture the coloring matters of the anthracene series which are derivatives of iso-dibenzanthrone containing nitrogen which coloring matters yield green solutions in concentrated sulfuric acid, violet-blue to greenish blue solutions in boiling nitrobenzene and yield blue vats with alkaline hydrosulfite from which vats cotton is dyed blue shades.

4. As a new article of manufacture the coloring matter of the anthracene series which is a nitrated iso-dibenzanthrone body, and which is a dark powder soluble in concentrated sulfuric acid with a green color, soluble in boiling nitrobenzene with a violet-blue color, yields with alkaline hydrosulfite a blue vat which dyes cotton blue shades.

In testimony whereof I have hereunto set my hand in the presence of two subscribing witnesses.

HUGO WOLFF.

Witnesses:
J. ALEC. LLOYD,
A. O. TITTMANN.

---

Correction in Letters Patent No. 1,063,000.

It is hereby certified that in Letters Patent No. 1,063,000, granted May 27, 1913, upon the application of Hugo Wolff, of Ludwigshafen-on-the-Rhine, Germany, for an improvement in "Anthracene Dyes and Making the Same," an error appears in the printed specification requiring correction as follows: Page 1, lines 34–46, for the group

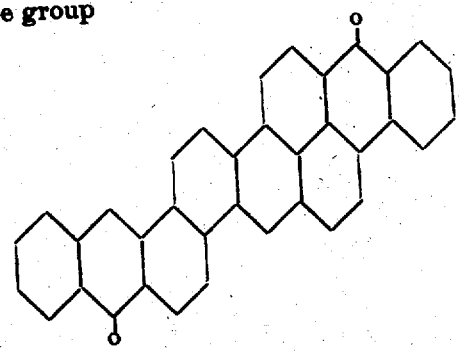 read 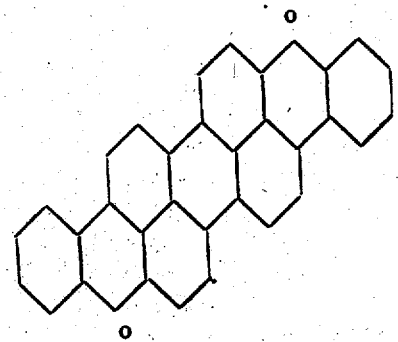

and that the said Letters Patent should be read with this correction therein that the same may conform to the record of the case in the Patent Office.

Signed and sealed this 19th day of August, A. D., 1913.

[SEAL.]

THOMAS EWING,

*Commissioner of Patents.*

It is hereby certified that in Letters Patent No. 1,063,000, granted May 27, 1913, upon the application of Hugo Wolff, of Ludwigshafen-on-the-Rhine, Germany for an improvement in "Anthracene Dyes and Making the Same," an error appears in the printed specification requiring correction as follows: Page 1, lines 34-46, for the group

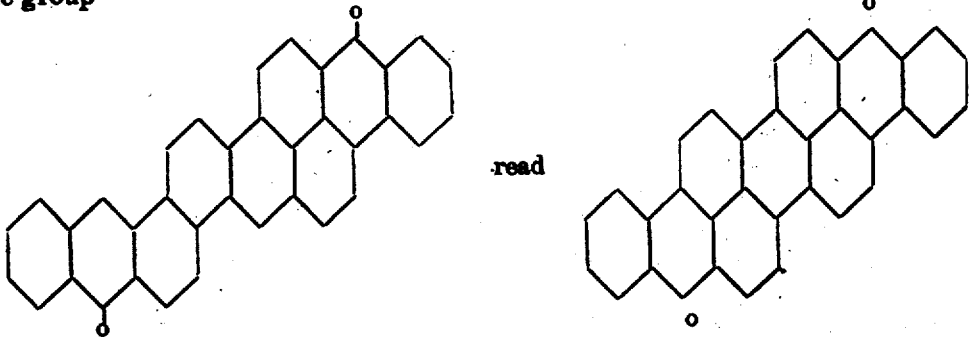

and that the said Letters Patent should be read with this correction therein that the same may conform to the record of the case in the Patent Office.

Signed and sealed this 19th day of August, A. D., 1913.

[SEAL.]

THOMAS EWING,

*Commissioner of Patents.*